Figure 1:
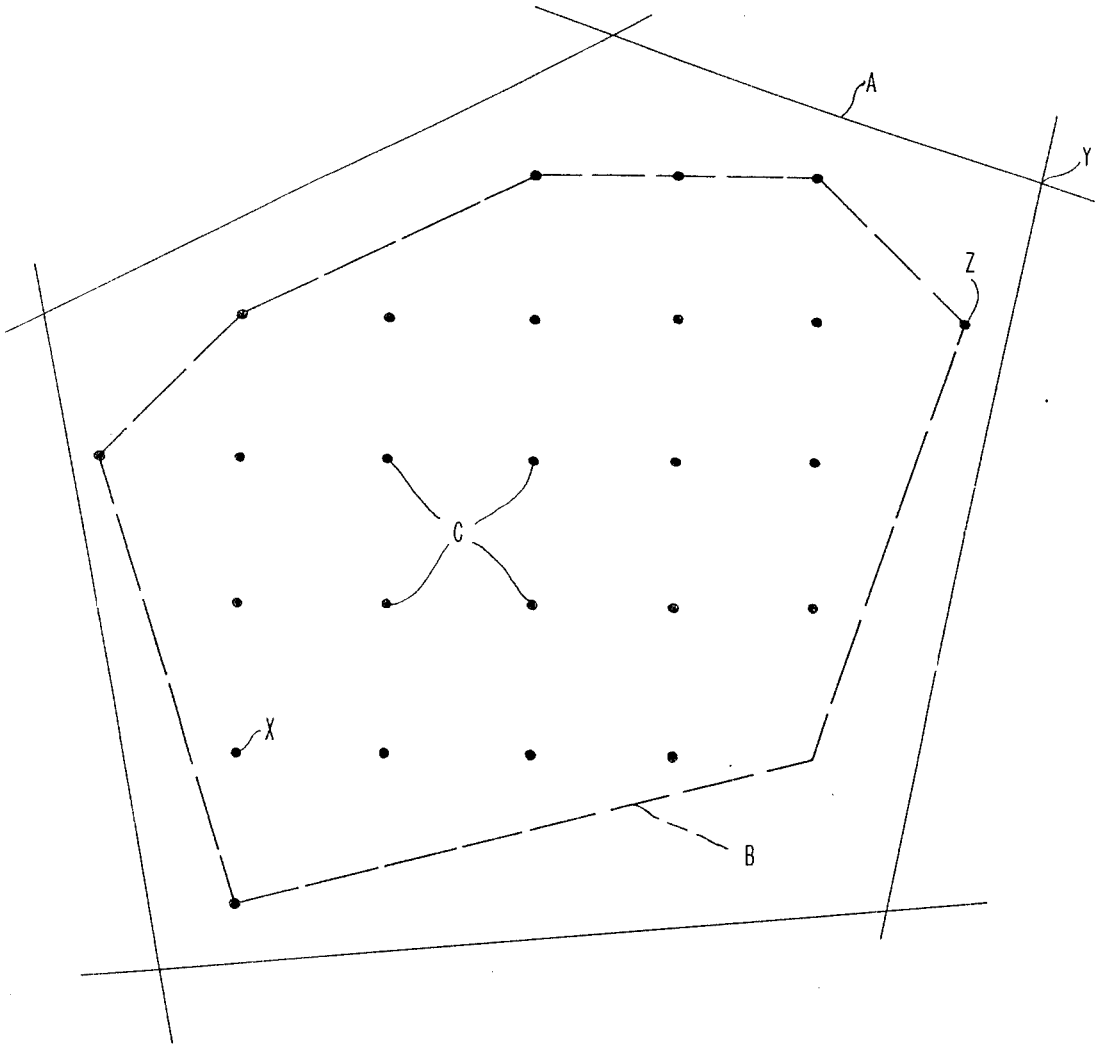
Figure 2:
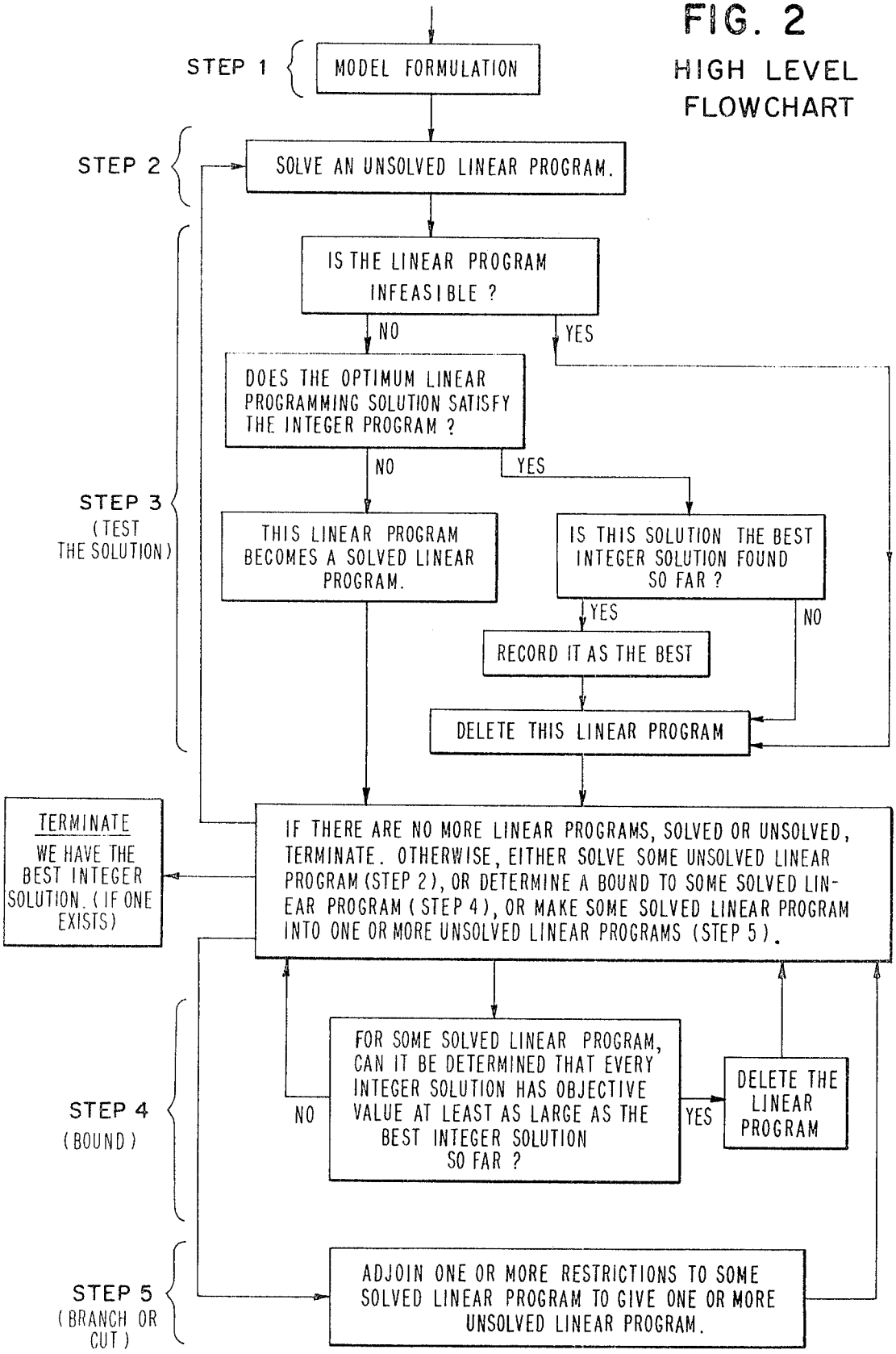
Figure 3:
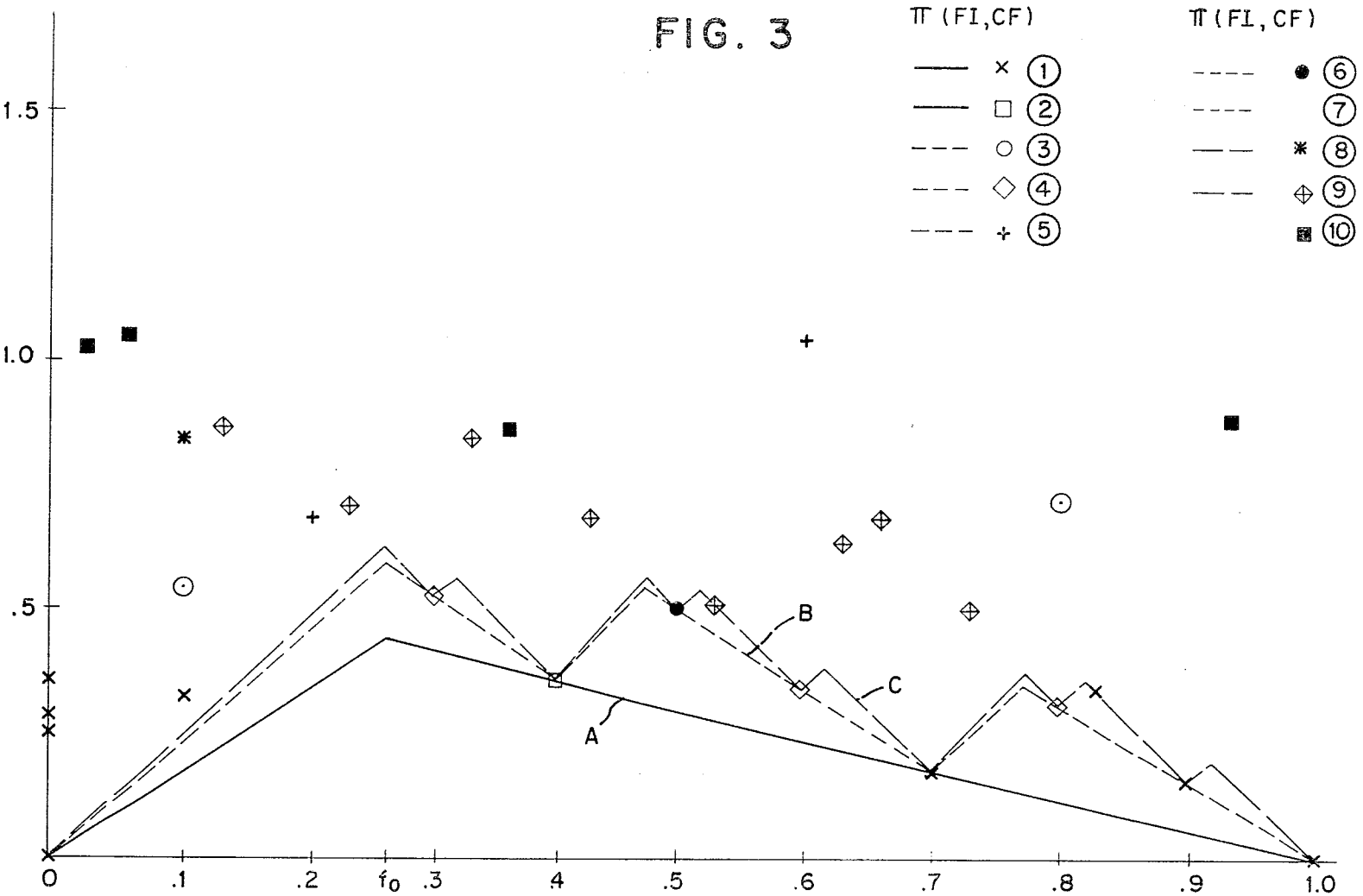
Figure 4A:
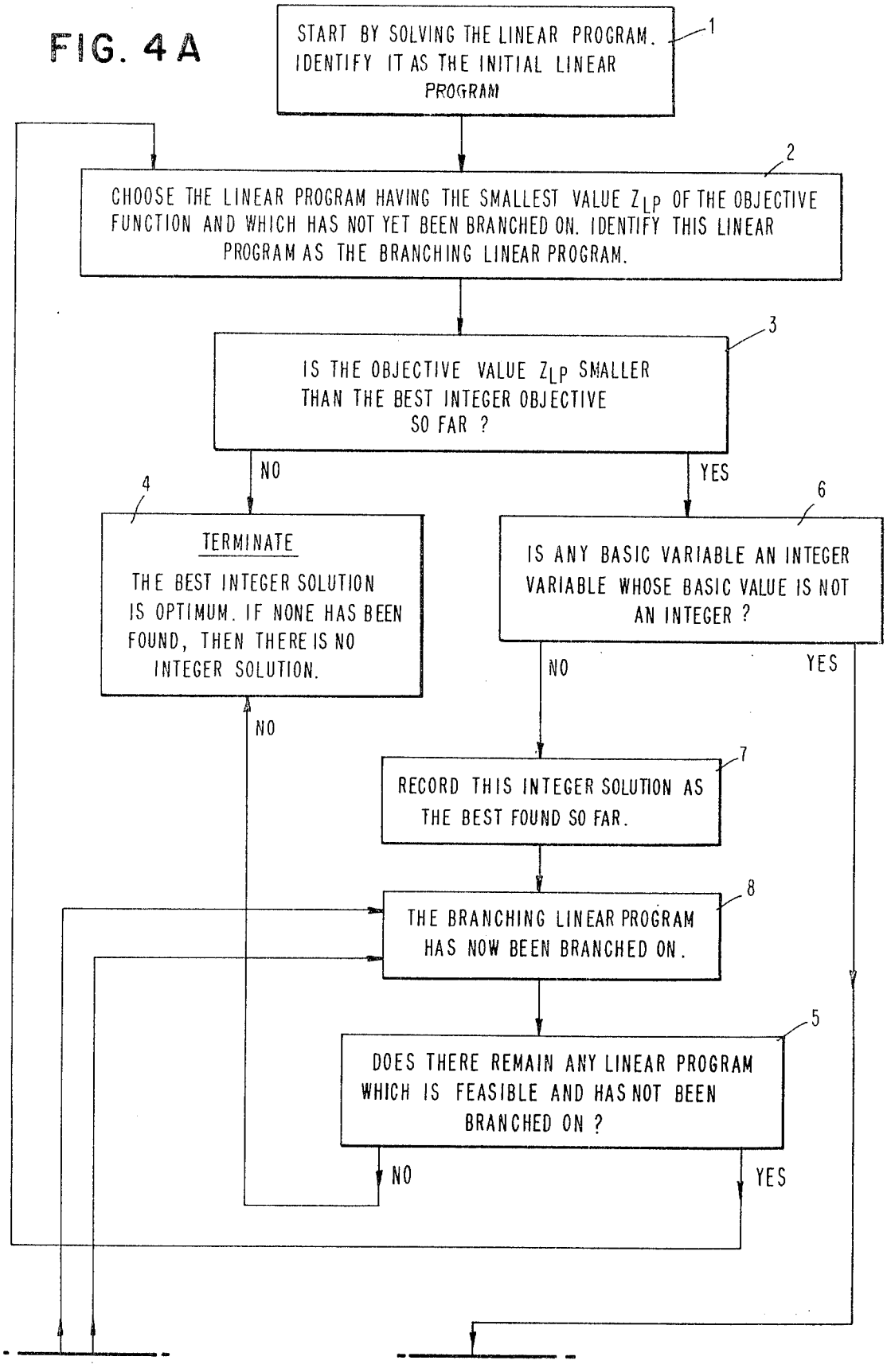
Figure 4B:
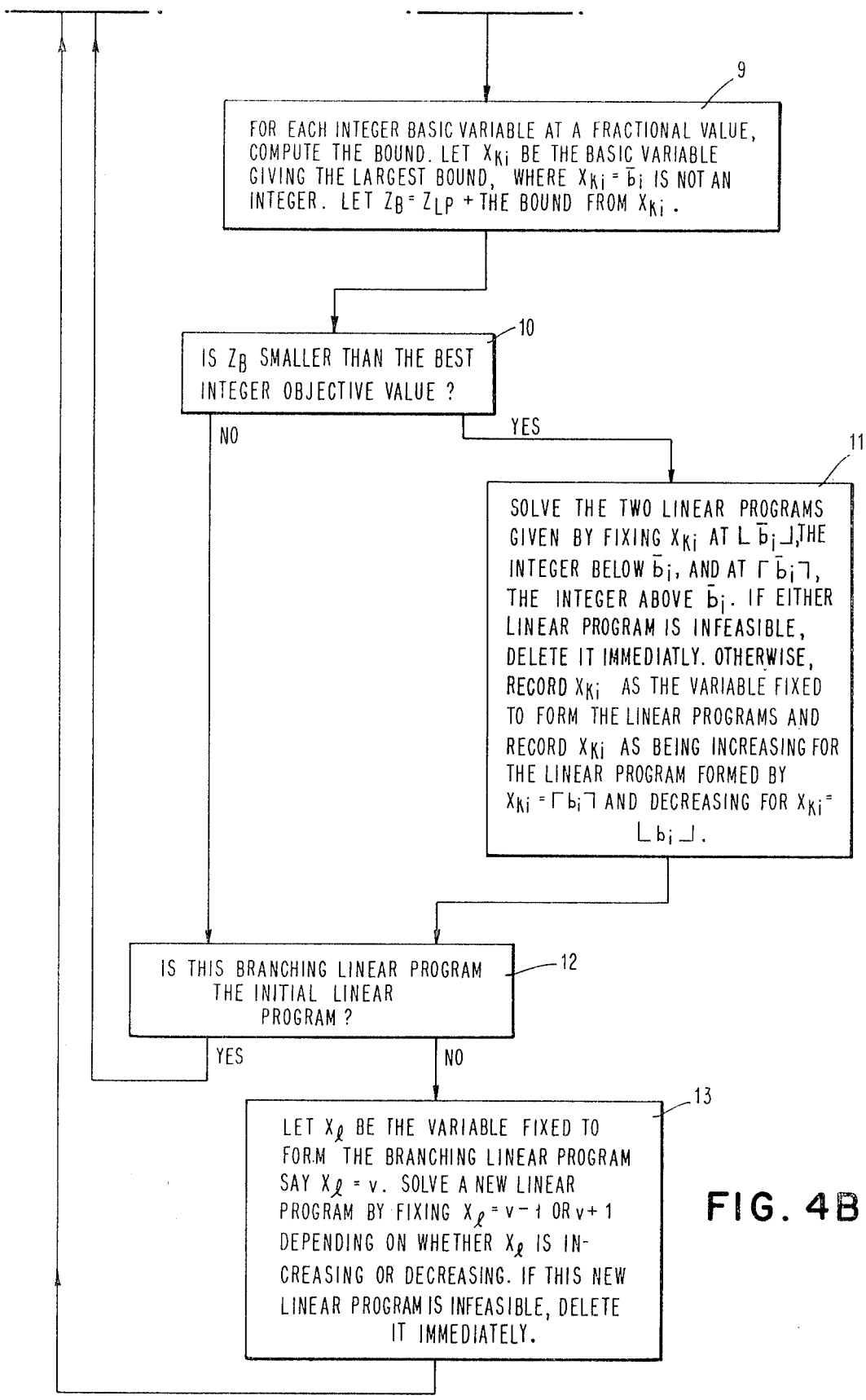
Figure 5A:
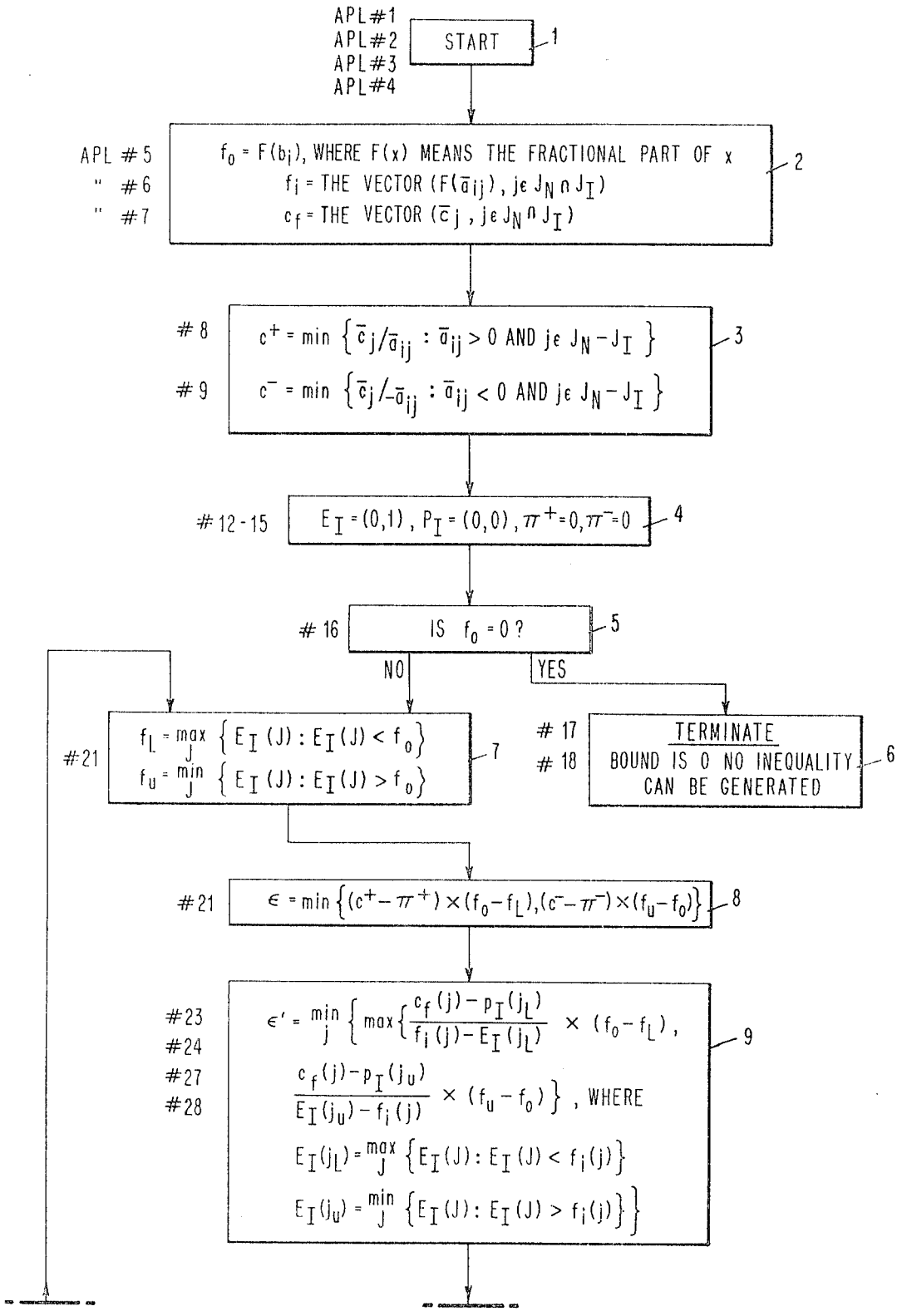
Figure 5B:
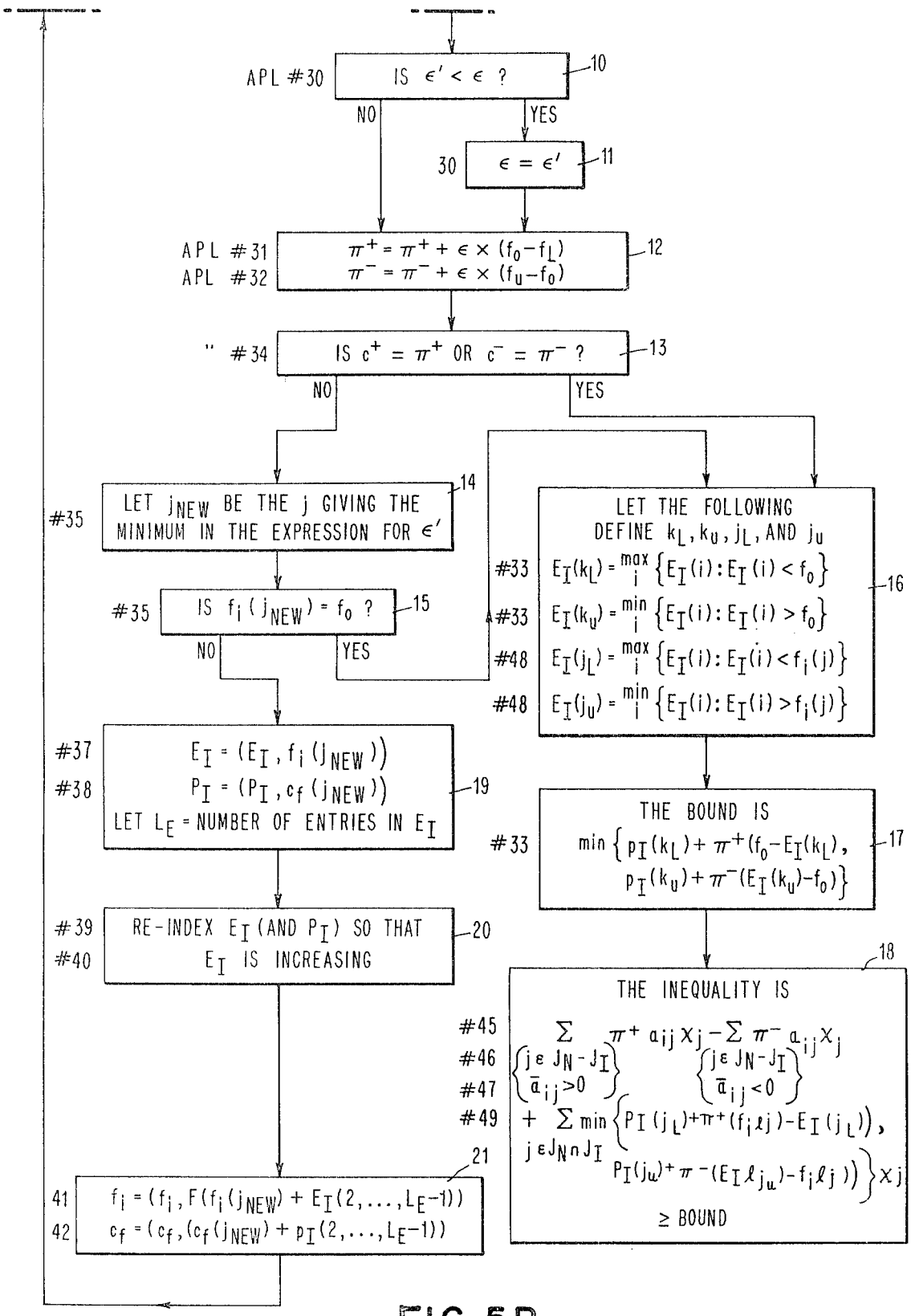

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 7, 1975

930 O.G. 115

T930,001

METHOD FOR FINDING OPTIMUM INTEGER-VALUED SOLUTION OF LINEAR PROGRAMS

Ralph E. Gomory, Chappaqua, and Ellis L. Johnson, Yorktown Heights, N.Y., assignors to International Business Machines Corporation, Armonk, N.Y.

Continuation of application Ser. No. 158,462, June 30, 1971. This application May 29, 1973, Ser. No. 364,396

**Int. Cl. G06f *15/34***

U.S. Cl. 444—1

7 Sheets Drawing. 108 Pages Specification

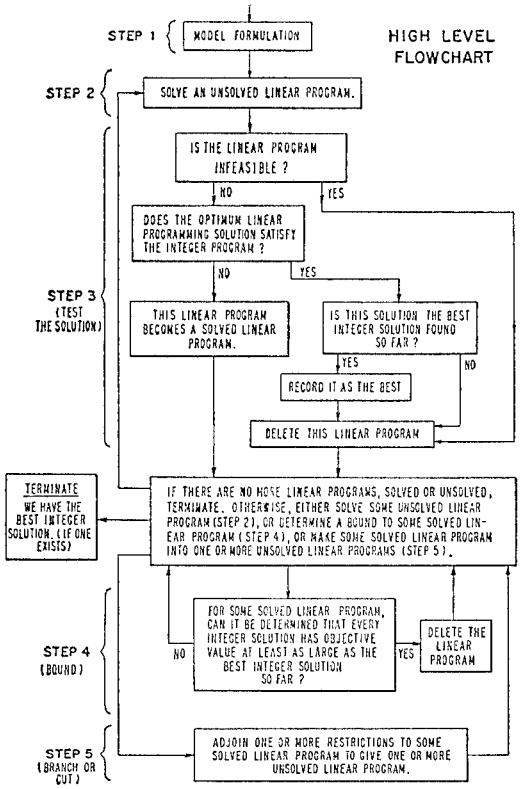

The Invention herein described was made in the course of or under a contract or subcontract thereunder, with the Department of the Navy.

The present invention relates to a method for finding optimum integer solutions to linear programs. In many linear programs, it is necessary to obtain integer values for certain variables. Starting with a solution of the linear program obtained, for example, by the Simplex Method, the present method develops bounds which are utilized to force certain variables to be integers with a minimum of machine calculations.

INVENTORS
RALPH E. GOMORY
ELLIS L. JOHNSON
BY Ray R. Sellemeyer, Jr.
ATTORNEY

HIGH LEVEL FLOWCHART